Patented Aug. 27, 1935

2,012,446

UNITED STATES PATENT OFFICE 2,012,446

METHOD OF SULPHURIZING PINE OIL AND PRODUCT THEREOF

McKinley C. Edwards, Jackson Heights, N. Y., and Joseph V. Congdon, Medford, Mass., assignors to Socony-Vacuum Oil Company, Incorporated, New York, N. Y., a corporation of New York No Drawing. Application July 21, 1934,
Serial No. 736,350

10 Claims. (Cl. 260—17)

This invention is directed to the manufacture of sulphurized cutting oils, and in particular is directed to improvements in the methods of making a sulphurized base for such oils by the compounding of sulphur and pine oil, and to the improved products obtained thereby.

It is common in the manufacture of cutting oils to prepare a "base" by compounding sulphur with various materials, such as animal oils, corn oil, some mineral oil fractions, pine oil, etc., and then blend this compound with a lubricant oil to give a final mixture containing upwards of a fraction of one per cent, by weight, of sulphur. Mere solution of sulphur in mineral oil does not give high percentages of sulphur, and the sulphur so added is not particularly stable. None of the known methods is capable of giving particularly high percentages of stable sulphur as an active ingredient.

Cutting oils are used as lubricants in machine tool work, particularly in screw cutting machines, high speed lathe work, cutting-off machines, broaching operations, drawing operations, and the like. They are applied by flooding the point of contact of the tool and the work, and are subsequently collected and recirculated to the point of use. Criteria by which cutting oils are judged include speed and depth of cut which can be performed with a given oil, smoothness of cut, temperature rise of tool, etc., stability of oil with retention of quality under repeated re-use, odor, particularly when heated, color, and freedom from infectious properties. The most effective oils are those containing sulphur. The theory behind the use of sulphur is not known, although its efficacy is well established. It is believed that the sulphur is liberated in minute quantities at the point of contact of tool and work, with the possible formation of metallic sulphides, and that these products are the true lubricants. This is supported to some extent by the generally true statement that crystalline sulphur, not matter how fine, is largely ineffective, colloidal sulphur is partially effective, certain loosely bonded forms of chemically combined sulphur are of great effect, and well bonded sulphur compounds, not prone to liberation of sulphur, are not effective.

One type of sulphurized base capable of carrying a good percentage of sulphur in a relatively stable form is that produced by combining sulphur and pine oil as originally suggested by U. S. Bureau of Standards Technologic Paper No. 204. It is with improved methods of manufacture of this general type of base, and with the highly improved base so made, as well as the highly improved cutting oils, etc., compounded from such novel base, that this invention is particularly concerned.

The known method of preparing this base is as follows: One part by weight of elementary sulphur, either crude or refined, is placed in a heating vessel. Two parts of pine oil, preferably steam distilled, are then added to the vessel and heat is applied. As the temperature of the charge rises, the sulphur fuses. When a temperature of approximately 350° F. is reached, ebullition commences and the temperature rapidly rises to about 375° F. The sulphur passes into the pine oil, forming an apparently homogeneous mass. Heating of the charge is continued for a "cooking" period of usually about thirty minutes, the temperature gradually rising until it has reached 400°–420° F. It is said to be advantageous to hold the temperature below 475° F. After the cooking period the hot charge is mixed with about eight times as much lubricating oil (measured by weight), which mixing is carried out at a temperature not below the boiling point of water, and preferably near or above the melting point of sulphur. This process really is composed of two steps. The first is that of preparation of the sulphurized base, and is complete at the end of the "cooking" period. The second is that of blending this base with a lubricant. The base prepared by this method, if allowed to stand for several days at ordinary temperatures, or if cooled rapidly, will frequently deposit crystalline sulphur. That is, the base is not stable, although mixtures of it with oil are reasonably stable, and it is for this reason that the final step of preparation is a blending with lubricant before complete cooling of the reaction product.

The nature of this known process of preparing sulphurized pine oil bases and cutting oils gives rise to many difficulties. One of the most important of these difficulties is that of the corrosive nature of the product. Hydrogen sulphide is produced in the reaction, as one of the side products, and merely heating for the times now used and at the temperatures now used will not serve to remove it. Other side products of a sulphurous and corrosive nature are also formed, and these are not removed. These sulphur bearing side products of both kinds cause the sulphurized base and the oils compounded from it to be of an objectionably corrosive nature. In addition, these products are highly and offensively odorous, and, even in the lower percentage blends used commercially, they impart to the product a distinctive and unpleasant irritating or biting odor, particularly marked when the cutting oil is heated in use.

Water is a product of the sulphurizing reaction. Heating to the temperatures used in the known method for the times ordinarily used does not remove it. The residual water in the sulphurized base will dissolve hydrogen sulphide, with the resultant formation of sulphurous acid, and render the product and the blends made from it corrosive. Water alone often serves to impart to the products a cloudy and dirty appearance, whereas the fully dry product is clear and of high color.

Of major importance as a disadvantage of the known method of making the sulphurized base is the low flash point of the product. No matter how heavy the pine oil or pine oil fraction used, some of it breaks down or "cracks" to form lighter products of lower boiling point during the sulphurizing reaction. This action is of course more marked with higher temperatures. These light products persist even throughout the high temperatures used, and are not removed. Their presence in the product gives it an undesirably low flash point, and they are present in sufficient amounts to lower the flash point of compounded cutting oils made from the sulphurous base to a hazardous point, particularly when the base has been made from the lighter pine oils.

As a further disadvantage, the product of the known method is not really a sulphurized base, but rather is a compounded oil, a predominant proportion of a selected lubricant having been blended with a sulphurized base. Cutting oils are used under various widely different conditions and, for the best operation under each condition, it is desirable that a properly selected lubricant be used. With the known method of manufacture, only the lubricant already blended is available, as compounding with a sufficient amount of a different lubricant to alter the characteristics a desired amount would usually result in dilution of the sulphur content to such a point that its utility would vanish. To meet these wide requirements fully with the known method of manufacture would require making a multiplicity of batches, each with a different lubricant. It is therefore desirable that the end product of the first manufacturing step be a sulphurized base, capable of segregation, handling, and storage as such, sufficiently stable to avoid the precipitation of sulphur during such storage, and capable of being blended at any time and in any amount with any desired lubricant.

To further enhance the value of such a stable sulphurized base, to be stored, handled, and even vended as such, it is desirable that the concentration of sulphur be high, as the sulphur is the active ingredient. The known method discloses no means or method whereby the sulphur content of the sulphurized base may be increased above that percentage which will initially combine with the pine oil upon heating. The maximum sulphur content obtainable in the base with this known method is about thirty to thirty-five per cent by weight. Higher percentages than these are desirable. A further disadvantage of the known process is that compounded cutting oils of high percentages of sulphur, say of about eight per cent, can apparently be obtained in stable form only by a "cooking" of the blend for thirty minutes or more, and it is recommended to use an excess of pine oil above the one to two ratio specified, say three or four pine oil to one sulphur, to render the blended oils stable. Excess pine oil serves little purpose, if the sulphur be otherwise stable, and merely dilutes the useful lubricant. It is desirable that the sulphurized base concentrate be capable of blending in all proportions with lubricant, thus giving any desirable percentage of sulphur, without dilution by excess pine oil.

This invention has for one of its principal objects the preparation of a sulphurized pine oil base capable of use in cutting oils and other lubricants, which base will be stable against deposition of sulphur, low in corrosive properties, of unobjectionable odor, free from water, free from compounds tending to give it a hazardously low flash point, capable of storage and handling as a stable base free from blended lubricant, capable of being blended in all proportions with any desired lubricant with the simplest of methods, and having, if desired, a concentration of sulphur greater than that obtainable by initially dissolving sulphur in pine oil.

Another principal object of this invention has been the provision of a manufacturing method by which the novel sulphurized pine oil base just referred to can be manufactured, the characteristics of such base flowing principally from the characteristics of that manufacturing method.

All of these objects and advantages are largely obtained by the characteristic novel manner of manufacture of the sulphurized pine oil base, a full discussion of which is given below.

The equipment necessary for this method is a small batch still, of any type of convenient size. It may be heated by an external fire, by a steam jacket, by a closed steam coil placed internally, or by any other convenient means, such as electrical heating. The size is determined by the usual size of batch made. It should be equipped with an overhead vapor line, passing to a condenser, and a condensate receiver. A pump should be installed so that collected condensate, freed from water, may be pumped back into the still if desired. The still should be equipped internally with a perforated steam coil placed near the bottom, so that steam may be admitted to the products undergoing reaction. Equipment fulfilling these conditions is quite common, and of many well known forms, and easily obtainable.

A weighed charge of pine oil is placed in the still, and sulphur, in any amount up to thirty to thirty-five per cent, by weight, of the total mixture is added. Then the still is closed, and heated rapidly to a temperature of say 200°–220° F., when steam is introduced through the perforated coil into the charge, to agitate it. When the temperature of the mixture approaches 250° F., more or less, the rate of heating is decreased, and so controlled that the temperature of the mixture does not rise substantially above 300° F. The reaction is exothermic, and care is needed to hold the temperature at this level. The usual control is intended to hold the temperature between such limits as say 290° F. and 310° F. Too low a temperature causes undue slowness in the reaction, and too high a temperature causes undesirable qualities in the product as noted. The preferred range is as shown, but the temperature can be carried as high as 350° F. without undue spoilage of product. The mixture is then held at this temperature level (about 300° F. is preferred), until the reaction between the pine oil and sulphur is complete. Completion of the reaction will take from four to five hours, ordinarily, and may be tested for by withdrawing a small sample of the still contents, reducing by distillation to a desired sulphur content percentage, say, 50 per cent, roughly, and blending it with oil in the proportion of say, 1 base to 9 oil to determine if sulphur will precipitate. If sulphur is not precipitated, the reaction is complete. During this time of reaction, the agitation steam has been carrying off as vapors a considerable portion of the pine oil charge. These vapors are condensed, freed from water, and returned to the still. This return may be either intermittent or continuous, but is preferably continuous. When the reaction is completed, the temperature is maintained and the flow of internal open steam is maintained, but the return of condensed vapors is stopped. The steam stilling effect thus obtained serves to distill off the uncombined pine oil and the light ends of low flash point formed during the reaction, and the flow of steam frees the reaction product of hydrogen sulphide, and of other odorous and corrosive side products, as well as raises the flash. The steam stilling likewise serves to concentrate the mixture, by removal of uncombined pine oil, to a sulphur content of between 35 and 50 per cent by weight, as desired.

As starting material it is possible to use sulphur in any of its commercially available forms. Flowers of sulphur is of course most convenient, but lump, or other forms of sulphur may be used equally well, the dictating factor being largely that of price. The pine oil used may be any of the commercial terpene containing oils known as pine oils, steam distilled pine oils, and the like. As examples of these products, there are tabulated below the present commercial specifications of several products of this class sold upon the market by the Hercules Powder Co., the various products being designated by the trade names applied by that company,

| | Trade name | | |
|---|---|---|---|
| | "Yarmor" | "Dipentene #122" | "Solvenol" |
| Description | Steam distilled pine oil. | Steam distilled pine oil. | Terpene solvent. |
| Specific gravity | .937–.942 | | .850–.866 |
| Distillation (typical) | | | 325° F. |
| I. B. P | | | |
| 5% over | | 358° F. | |
| 95% over | | 437° F. | 400° F. | 392° F. |

Practically all of the terpene containing pine oil products of these general classes have been found capable of use, both the overhead steam-distilled products and the residuals. The residuals are usually of low color, and many of the overhead products are costly and in general, we prefer materials of the characteristics set forth above for "Dipentene #122" or "Yarmor".

As indicative of the type of pine oil preferred the following specification is given.

Gravity A. P. I. _____ 17° to 37°
Color _____ White-yellow
Distillation
 I. B. P. _____ 200° F.–350° F.
 E. P. _____ 375° F.–460° F.
Saponification value A. S. T. M.. 0.50%–3.0%
Iodine value (Hanus method) _ 100–260

A typical sulphurized base produced by this method from "Dipentene #122" had the following properties:
Specific gravity _____ 1.154
Pour point _____ Below 0° F.
Flash (Cleveland open cup) _____ 160° F.
Fire _____ 175° F.
Saybolt universal
 viscosity @210° F _____ 62"
Color A. S. T. M _____ 7 dark
Sulphur per cent _____ 38.1

These properties vary with increase in the percentage of sulphur, the gravity becoming higher, the color darker, and the viscosity greater as the combined sulphur increases. The properties being so dependent upon the sulphur content, the most pertinent definition of the range of properties to be expected in the sulphurized base of this invention can be reduced to a statement of the percentage of combined sulphur. We have found this range to be from about 30–35 per cent of sulphur to about 50 per cent of sulphur as a general upper limit, though with care, bases have been produced containing even a greater amount of sulphur than this.

This base is capable of being blended with any lubricant in any desired proportion, there being no necessity for hot blending except for such heating as is desirable to reduce the viscosity of the oils being blended to bring about easier handling.

As an example of the type of cutting oils made by blending this base, a blend of twelve per cent by weight of the 33.1% sulphur base quoted above with eighty-eight per cent by weight of a light paraffine oil of approximately 100 seconds viscosity at 100° F., gave an oil having the following properties:

Gravity—Deg. A. P. I _____ 21.9°
Gravity—Specific _____ .922
Flash (C. O. C.) _____ 315° F.
Fire _____ 375° F.
Vis. @ 100° F. (Saybolt Universal) 115"
Color A. S. T. M _____ 4 light
Sulphur % _____ 5.0
Appearance _____ Bright The blending can of course be performed with a lubricant of any viscosity, the choice being governed by the conditions of loading and flow to be met with in the operation to be lubricated. The usual preference is for light lubricants of viscosities around 100 seconds. Saybolt Universal, at 100° F. The commonly used concentrations of sulphur are around 1%, and these, together with the viscosity of the lubricant used are dictated by the exact nature of the job and the personal preferences and experiences of the user. As an example of the range of desirable concentration, a cutting oil containing 0.5% sulphur is desirable for use on light high speed lathe work, cutting nipples, etc., while an oil containing 5% of sulphur is desirable for such jobs as drilling solder, etc. We have found it convenient to prepare an oil containing 5% sulphur, in a lubricant of 100" Saybolt Universal viscosity at 100° F., and vend this oil to the user, enabling him to dilute this with similar oil, or lighter or heavier oils as he may desire and thus prepare his own final product.

In some cases we have found it desirable to compound the cutting oil with varying amounts of animal or vegetable oils. The following is an example of such an oil:

| | Per cent |
|---|---|
| Sulphurized pine oil base | 5 |
| No. 1 lard oil | 10 |
| Light paraffine oil | 85 |

The animal or vegetable oil so used may preferably be present in any amount ranging from 5% to 20% of the total product, and the sulphur may likewise be varied in concentration as above indicated. As examples of the animal and other oils which we might use, we might cite castor oil, soya bean oil, tallow oil, saponified red oil, common degras, neutral degras, and similar oils.

It is customary in compounding cutting oils to add a very small proportion of some scenting agent, to mask the undesirable odor. This is not necessary in these products, but we may frequently add such scenting agents merely as a matter of conforming to the customer's preference. In such cases, about one per cent of unsulphurized pine oil is found to be a convenient scenting agent.

All of the products prepared from bases manufactured by the process of this invention partake of the properties of the base, namely; controlled flash point, freedom from hydrogen sulphide, freedom from water, comparative freedom from corrosive properties, high color, and high stability, combined with the ability to obtain products more highly concentrated with respect to sulphur. The advantages of the bases and compounds produced therefrom are ascribed to the difference between the present process of compounding the base and the process heretofore known and made use of. Those differences are reacting at a lower temperature for a longer time, agitating with live steam while undergoing reaction, and the subsequent steam distillation of the reaction product to top it to a desired concentration and flash point.

We claim:

1. That method of preparing a sulphurized base for lubricant manufacture which comprises heating together sulphur and pine oil, agitating the reaction mixture with steam, checking the rise of temperature of the reaction mixture at approximately 300° F., holding it at substantially that temperature whilst continuing the agitation with steam and condensing and returning to the mixture the pine oil fraction carried away as vapor until completion of the reaction, followed by steam distillation of the reaction product to reduce it to a desired flash point and sulphur concentration.

2. That method of preparing a sulphurized base for lubricant manufacture which comprises charging a still with pine oil and sulphur in approximately the proportions of two parts pine oil and one part sulphur by weight, heating the mixture to approximately 300° F., in the presence of agitating steam, holding the reaction mixture at substantially that temperature until completion of the reaction whilst continuing the introduction of steam, at the same time condensing the still vapors, separating distilled pine oil therefrom and returning it to the still, and thereafter steam stilling the reaction product to remove light ends and unreacted pine oil, the degree of such steam stilling being controlled to yield a product of desired flash point and sulphur concentration.

3. That method of preparing a sulphurized base for lubricant manufacture which comprises heating together sulphur and pine oil, agitating the reaction mixture with steam, checking the rise of temperature of the reaction mixture, holding the temperature within the range 290° F. to 350° F., whilst continuing the agitation with steam and condensing and returning to the mixture the pine oil fraction carried away as vapor, until completion of the reaction, followed by steam distillation of the reaction product to reduce it to a desired flash point and sulphur concentration.

4. That method of preparing a sulphurized base for lubricant manufacture which comprises charging a still with pine oil and sulphur in approximately the proportions of two parts pine oil and one part sulphur by weight, heating the mixture to approximately 300° F., in the presence of agitating steam, holding the reaction mixture within the temperature range from 290° F. to 350° F., until completion of the reaction while continuing the introduction of steam, at the same time condensing the still vapors, separating distilled pine oil therefrom and returning it to the still, and thereafter steam stilling the reaction product to remove light ends and unreacted pine oil, the degree of such steam stilling being controlled to yield a product of desired flash point and sulphur concentration.

5. That method of preparing a sulphurized base for lubricant manufacture which comprises heating together sulphur and pine oil, agitating the reaction mixture with steam, checking the rise of temperature of the reaction mixture at approximately 300° F., holding it at substantially that temperature while continuing the agitation with steam and condensing and returning to the mixture the pine oil fraction carried away as vapor until completion of the reaction, followed by steam distillation of the reaction product to reduce it to a desired sulphur concentration in excess of 35 per cent by weight.

6. That method of preparing a sulphurized base for lubricant manufacture which comprises charging a still with pine oil and sulphur in approximately the proportions of two parts pine oil and one part sulphur by weight, heating the mixture to approximately 300° F. in the presence of agitating steam, holding the reaction mixture at that temperature until completion of the reaction while continuing the introduction of steam, at the same time condensing the still vapors, separating distilled pine oil therefrom and returning it to the still, and thereafter steam stilling the reaction product to remove light ends and unreacted pine oil, the degree of such steam stilling being controlled to yield a product of desired sulphur concentration in excess of 35 per cent by weight.

7. That method of preparing a sulphurized base for lubricant manufacture which comprises heating together sulphur and pine oil, agitating the reaction mixture with steam, checking the rise of temperature of the reaction mixture, holding the temperature within the range 290° F. to 350° F., while continuing the agitation with steam and condensing and returning to the mixture the pine oil fraction carried away as vapor, until completion of the reaction, followed by steam distillation of the reaction product to reduce it to a desired sulphur concentration in excess of 35 per cent by weight.

8. That method of preparing a sulphurized base for lubricant manufacture which comprises charging a still with pine oil and sulphur in approximately the proportions of two parts pine oil and one part sulphur by weight, heating the mixture to approximately 300° F., in the presence of agitating steam, holding the reaction mixture within the temperature range from 290° F. to 350° F., until completion of the reaction while continuing the introduction of steam, at the same time condensing the still vapors, separating distilled pine oil therefrom and returning it to the still, and thereafter steam stilling the reaction product to remove light ends and unreacted pine oil, the degree of such steam stilling being controlled to yield a product of desired sulphur concentration in excess of 35 per cent by weight.

9. A sulphurized pine oil base for the compounding of lubricants, which base has been prepared by reacting pine oil and sulphur and which is characterized by a concentration of stable sulphur substantially in excess of the concentration to which sulphur will initially react with pine oil.

10. A sulphurized pine oil base for the compounding of lubricants, which base has been prepared by reacting pine oil and sulphur in the presence of steam and which is characterized by a concentration of stable sulphur substantially in excess of the concentration, namely approximately 35%, to which sulphur will initially react with pine oil, by a flash point in excess of 150° F., and by a substantially greater freedom from corrosive and odorous sulphur compounds than the base prepared in the absence of steam.

McKINLEY C. EDWARDS.
JOSEPH V. CONGDON.